(12) United States Patent
Watanabe

(10) Patent No.: US 10,789,763 B2
(45) Date of Patent: Sep. 29, 2020

(54) PERIPHERY MONITORING DEVICE

(71) Applicant: AISIN SEIKI KABUSHIKI KAISHA, Kariya-shi, Aichi-ken (JP)

(72) Inventor: Kazuya Watanabe, Anjo (JP)

(73) Assignee: AISIN SEIKI KABUSHIKI KAISHA, Kariya-shi, Aichiken (JP)

( * ) Notice: Subject to any disclaimer, the term of this patent is extended or adjusted under 35 U.S.C. 154(b) by 16 days.

(21) Appl. No.: 16/244,589

(22) Filed: Jan. 10, 2019

(65) Prior Publication Data

US 2019/0221028 A1 Jul. 18, 2019

(30) Foreign Application Priority Data

Jan. 17, 2018 (JP) .................. 2018-005831

(51) Int. Cl.
*G06T 15/20* (2011.01)
*G06T 7/73* (2017.01)
(Continued)

(52) U.S. Cl.
CPC .............. *G06T 15/20* (2013.01); *B60K 35/00* (2013.01); *B60R 1/00* (2013.01); *B62D 15/021* (2013.01); *B62D 15/0295* (2013.01); *G06T 7/73* (2017.01); *B60R 2300/305* (2013.01); *B60R 2300/605* (2013.01); *G06T 2207/10028* (2013.01); *G06T 2207/30261* (2013.01)

(58) Field of Classification Search
CPC . G06T 15/00; G06T 7/73; G06T 2207/10028; G06T 2207/30261; B60K 35/00; B60R 1/00; B60R 2300/305; B60R 2300/605; B62D 15/021; B62D 15/0295
See application file for complete search history.

(56) References Cited

U.S. PATENT DOCUMENTS

2012/0068840 A1 3/2012 Ozaki et al.
2012/0069188 A1 3/2012 Ohno et al.
(Continued)

FOREIGN PATENT DOCUMENTS

JP 2010-274814 A 12/2010
JP 2012-25327 A 2/2012
(Continued)

OTHER PUBLICATIONS

International Search Report for PCT/JP2018/008409 dated May 22, 2018.

*Primary Examiner* — Haixia Du
(74) *Attorney, Agent, or Firm* — Sughrue Mion, PLLC

(57) ABSTRACT

A periphery monitoring device includes: an image generation unit configured to generate a display image in which a gaze point in a virtual space is viewed from a virtual viewpoint, the virtual space being based on a model image formed by projecting a captured image obtained by imagining a periphery of a vehicle with an imaging unit mounted in the vehicle onto a model representing a three-dimensional virtual plane configured around the vehicle; and an image output unit configured to output the display image to a display unit, in which the image generation unit moves at least one of the virtual viewpoint and the gaze point in a direction including a component in a vehicle width direction of the vehicle according to an operation of a steering unit for changing a steering angle of the vehicle.

9 Claims, 12 Drawing Sheets

(51) Int. Cl.
*B60K 35/00* (2006.01)
*B25D 15/02* (2006.01)
*B60R 1/00* (2006.01)
*B62D 15/02* (2006.01)

(56) References Cited

U.S. PATENT DOCUMENTS

| | | |
|---|---|---|
| 2015/0262488 A1 | 9/2015 | Ohno et al. |
| 2016/0152264 A1* | 6/2016 | Watanabe .......... B62D 15/0295 |
| | | 701/41 |
| 2018/0286095 A1* | 10/2018 | Kusayanagi .............. B60R 1/00 |

FOREIGN PATENT DOCUMENTS

| | | |
|---|---|---|
| JP | 5273068 B2 | 8/2013 |
| JP | 2013-191969 A | 9/2013 |
| JP | 5658507 B2 | 1/2015 |
| JP | 2016-213841 A | 12/2016 |

* cited by examiner

PERIPHERY MONITORING DEVICE

CROSS REFERENCE TO RELATED APPLICATIONS

This application is based on and claims priority under 35 U.S.C. § 119 to Japanese Patent Application 2018-005831, filed on Jan. 17, 2018, the entire contents of which are incorporated herein by reference.

TECHNICAL FIELD

Embodiments of this disclosure relate to a periphery monitoring device.

BACKGROUND DISCUSSION

In the related art, there has been considered a technology of generating a peripheral image showing a circumstance around a vehicle viewed from a virtual viewpoint based on a captured image obtained by imaging a periphery of the vehicle and presenting the generated peripheral image to an occupant of the vehicle. As such a technology, for example, there has been known a technology of presenting, to an occupant, a peripheral image viewed from a virtual viewpoint in which an obstacle appears when the obstacle is detected in the heading direction of a vehicle. See, for example, JP 5273068 B (Reference 1).

In the above-described conventional technology, a change in the virtual viewpoint occurs only when the obstacle is detected. However, in order to further improve the convenience of grasping a circumstance around the vehicle, it is necessary to change the virtual viewpoint of a peripheral image (the direction of a line of sight for grasping a circumstance around the vehicle) without presupposing the detection of the obstacle.

Thus, a need exists for a periphery monitoring device which is not susceptible to the drawback mentioned above.

SUMMARY

A periphery monitoring device as one example of an embodiment of this disclosure includes an image generation unit configured to generate a display image in which a gaze point in a virtual space is viewed from a virtual viewpoint, the virtual space being based on a model image formed by projecting a captured image obtained by imagining a periphery of a vehicle with an imaging unit mounted in the vehicle onto a model representing a three-dimensional virtual plane configured around the vehicle, and an image output unit configured to output the display image to a display unit, in which the image generation unit moves at least one of the virtual viewpoint and the gaze point in a direction including a component in a vehicle width direction of the vehicle according to an operation of a steering unit for changing a steering angle of the vehicle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment will be described with reference to the drawings. A configuration of the embodiment and actions and results (effects) caused by the corresponding configuration described below are merely given by way of example and are not limited to the following description.

Figure 1:
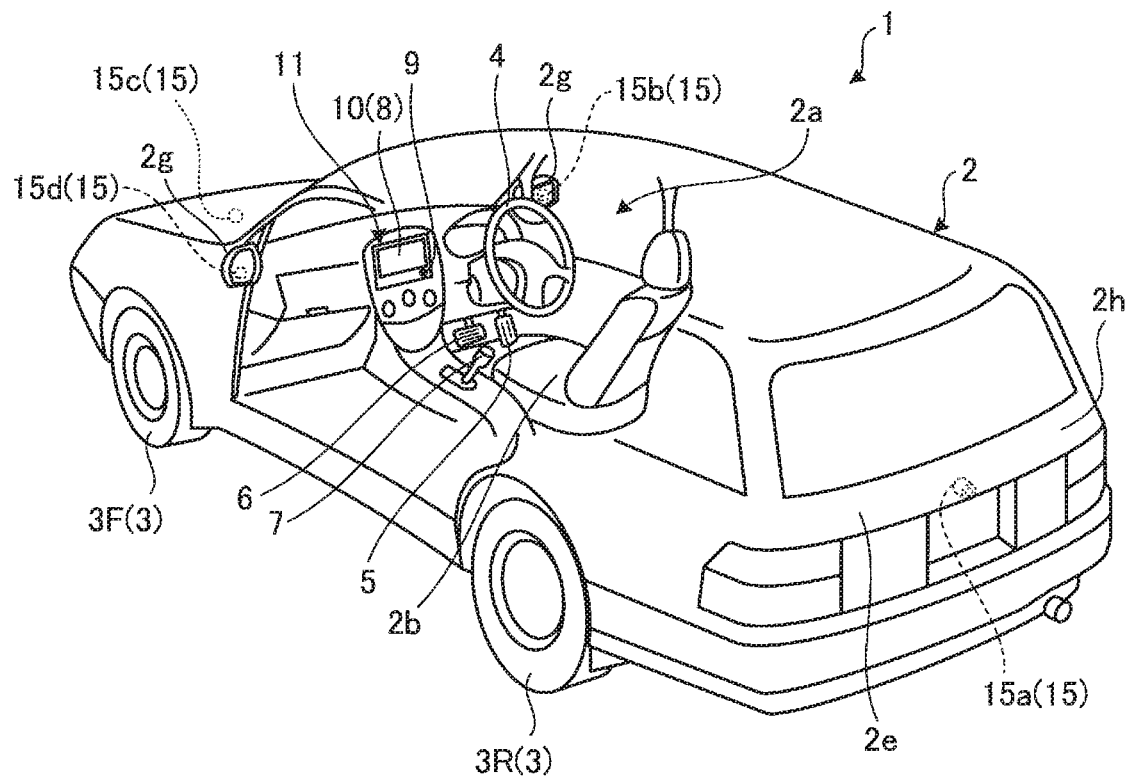
FIG. 1 is an exemplary and schematic perspective view illustrating a state where a portion of a vehicle cabin of a vehicle according to an embodiment is viewed therethrough.
Figure 2:
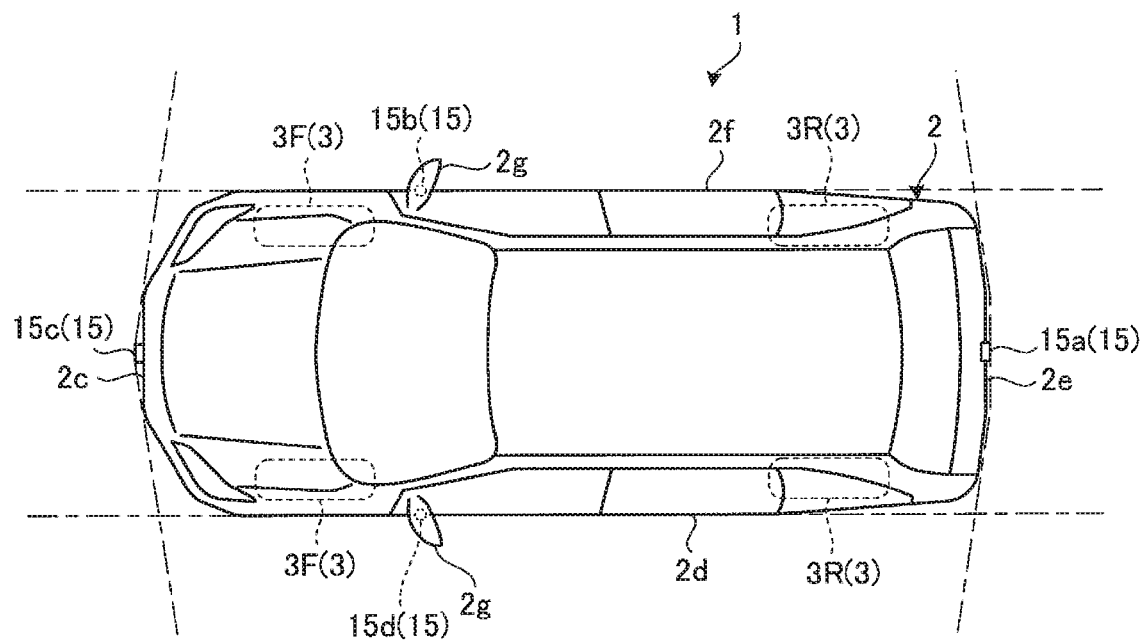
FIG. 2 is an exemplary and schematic view illustrating a state where the vehicle according to the embodiment is viewed from above.

First, a schematic configuration of a vehicle 1 according to the embodiment will be described with reference to FIGS. 1 and 2. FIG. 1 is an exemplary and schematic perspective view illustrating a state where a portion of a vehicle cabin 2a of the vehicle 1 according to the embodiment is viewed therethrough. In addition, FIG. 2 is an exemplary and schematic view illustrating a state where the vehicle 1 according to the embodiment is viewed from above.

As illustrated in FIG. 1, the vehicle 1 according to the embodiment includes a vehicle body 2 and the vehicle cabin 2a formed inside the vehicle body 2. In the vehicle cabin 2a, for example, a steering unit 4, an acceleration operation unit 5, a braking operation unit 6, and a speed-change operation unit 7 are provided in a state where an occupant (e.g., a driver) of the vehicle 1 is operable from the seat 2b.

The steering unit 4 is a steering wheel that protrudes from a dashboard (instrument panel). The acceleration operation unit 5 is an accelerator pedal that is provided under the feet of the driver. The braking operation unit 6 is a brake pedal that is provided under the feet of the driver. The speed-change operation unit 7 is a shift lever that protrudes from a center console.

In the vehicle cabin 2a, a monitor device 11 is provided, which includes a display 8 capable of outputting various images and a sound output device 9 capable of outputting various sounds. The monitor device 11 is provided in a central portion in the vehicle width direction (transverse direction) of the dashboard in the vehicle cabin 2a. The display 8 is configured with, for example, a liquid crystal display (LCD) or an organic electroluminescence display (OELD), and is configured to be capable of displaying a peripheral image showing, for example, a circumstance around the vehicle 1. A specific content of the peripheral image will be described later, but an example of the peripheral image may be, for example, a bird's-eye view image in which a circumstance around the vehicle 1 is viewed from above.

Here, an area of the display 8 according to the embodiment in which an image is displayed, i.e., a display screen is provided with a touch panel 10 which is capable of detecting coordinates of a position in the display screen to which a pointer such as, for example, a finger or a stylus is in proximity (including in contact). Therefore, a user (the occupant of the vehicle 1) may view the image displayed on the display screen of the display 8, and may also perform various input operations by performing an input operation (e.g., touch/tap operation) using the pointer on the touch panel 10. Thus, the touch panel 10 functions as an operation input unit that receives an operation input from the occupant of the vehicle 1.

In addition, in the embodiment, the monitor device 11 may include various physical operation input units such as, for example, a switch, a dial, a joystick, or a push button. In addition, in the embodiment, another sound output device may be provided at a position different from the position of the monitor device 11 in the vehicle cabin 2a. In this case, it is possible to output various types of sound information from both the sound output device 9 and the other sound output device. In addition, in the embodiment, the monitor device 11 may be configured to be capable of displaying information on various systems such as, for example, a navigation system or an audio system.

In addition, as illustrated in FIGS. 1 and 2, the vehicle 1 according to the embodiment is a four-wheel vehicle having two left and right front wheels 3F and two left and right rear wheels 3R. Hereinafter, for simplicity, the front wheels 3F and the rear wheels 3R may be collectively referred to as wheels 3. In the embodiment, the sideslip angle of some or all of the four wheels 3 is changed (steered), for example, according to an operation of the steering unit 4.

The vehicle 1 includes plural (four in the example of FIGS. 1 and 2) imaging units 15a to 15d. The imaging unit 15a is provided on a rear end 2e of the vehicle body 2 (e.g., under a door 2h of a rear trunk) to capture an image of an area at the rear of the vehicle 1. In addition, the imaging unit 15b is provided on a door mirror 2g on a right end 2f of the vehicle body 2 to capture an image of an area at the right of the vehicle 1. In addition, the imaging unit 15c is provided on a front end 2c of the vehicle body 2 (e.g., a front bumper) to capture an image of an area at the front of the vehicle 1. In addition, the imaging unit 15d is provided on a door mirror 2g on a left end 2d of the vehicle body 2 to capture an image of an area at the left of the vehicle 1. Hereinafter, for simplicity, the imaging units 15a to 15d may be collectively referred to as the imaging unit 15.

The imaging unit 15 is a so-called digital camera having an imaging element such as, for example, a charge coupled device (CCD) or a complementary metal oxide semiconductor (CMOS) image sensor (CIS). The imaging unit 15 performs imaging a periphery of the vehicle 1 at a predetermined frame rate and outputs image data of a captured image obtained by the imaging. The image data output from the imaging unit 15 may constitute a video image as a frame image.

Figure 3:
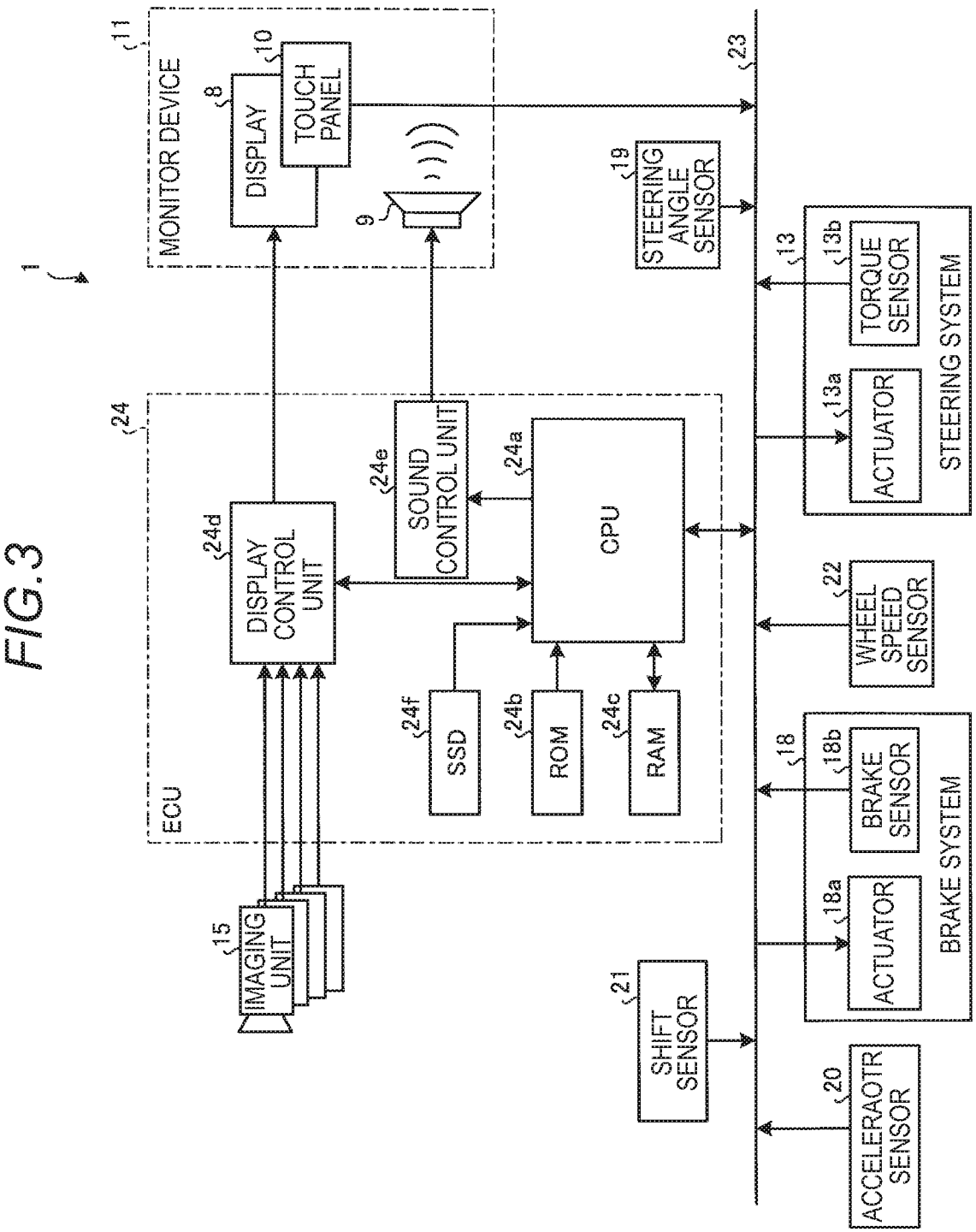
FIG. 3 is an exemplary and schematic block diagram illustrating a schematic hardware configuration inside the vehicle according to the embodiment.

Next, an internal configuration of the vehicle 1 according to the embodiment will be described with reference to FIG. 3. FIG. 3 is an exemplary and schematic block diagram illustrating a schematic hardware configuration inside the vehicle 1 according to the embodiment.

As illustrated in FIG. 3, the vehicle 1 according to the embodiment is provided with the monitor device 11, a steering system 13, the imaging unit 15, a brake system 18, a steering angle sensor 19, an accelerator sensor 20, a shift sensor 21, a wheel speed sensor 22, and an electronic control unit (ECU) 24.

The above-described various components (the monitor device 11, the steering system 13, the brake system 18, the steering angle sensor 19, the accelerator sensor 20, the shift sensor 21, the wheel speed sensor 22, and the ECU 24) are electrically connected to each other via an in-vehicle network 23. The in-vehicle network 23 is, for example, an electric communication line configured by a controller area network (CAN).

The steering system 13 is, for example, an electric power steering system or a steer-by-wire (SBW) system. The steering system 13 includes an actuator 13a and a torque sensor 13b. The steering system 13 steers some or all of the wheels 3 by operating the actuator 13a under the control of, for example, the ECU 24 to be described later. The torque sensor 13b detects a torque generated according to an operation of the steering unit 4 by the driver, and transmits a detection result to the ECU 24.

The brake system 18 includes, for example, an anti-lock brake system (ABS), an electronic stability control (ESC) that prevents side slipping, an electric brake system, or a brake-by-wire (BBW). The brake system 18 includes an actuator 18a and a brake sensor 18b. The brake system 18 applies a braking force to the wheel 3 by operating the actuator 18a under the control of, for example, the ECU 24 to be described later. The brake sensor 18b detects the position (displacement) of a brake pedal as a movable element in the braking operation unit 6, and transmits a detection result to the ECU 24.

The steering angle sensor 19 is a sensor that detects the amount of operation of the steering unit 4 by the driver. For example, the steering angle sensor 19 is configured by a Hall element, for example, detects the rotation angle of a rotating portion of the steering unit 4 as the amount of steering, and transmits a detection result to the ECU 24. In addition, the accelerator sensor 20 detects the position (displacement) of an accelerator pedal as a movable element in the acceleration operation unit 5, and transmits a detection result to the ECU 24.

The shift sensor 21 detects the position of a movable element such as, for example, a shift lever in the speed-change operation portion 7, and transmits a detection result to the ECU 24. In addition, the wheel speed sensor 22 detects, for example, the amount of rotation of the wheel 3, or the number of revolutions per unit time of the wheel 3, and transmits a detection result to the ECU 24.

The ECU 24 has the same hardware configuration as an ordinary computer which includes a central processing unit (CPU) 24a, a read only memory (ROM) 24b, a random access memory (RAM) 24c, a display control unit 24d, a sound control unit 24e, a solid state drive (SSD) 24f.

The CPU 24a is a control unit that controls the entire vehicle 1. The CPU 24a reads a program stored in a storage device such as, for example, the ROM 24b or the SSD 24f, and operates in response to a command included in the program to execute various processings. The RAM 24c is used, for example, as a work area when the CPU 24a executes various processings.

The display control unit 24d controls the output of an image via the display 8. In addition, the sound control unit 24e controls the output of sound via the sound output device 9.

In addition, in the ECU 24 according to the embodiment, the CPU 24a, the ROM 24b, and the RAM 24c may be mounted in one integrated circuit. In addition, in the ECU 24 according to the embodiment, for example, a processor such as, for example, a digital signal processor (DSP) or a logic circuit may be provided as a control unit that controls the entire vehicle 1, instead of the CPU 24a. In addition, in the embodiment, instead of the SSD 24f (or in addition to the SSD 24f), a hard disk drive (HDD) may be provided as a main storage device that stores, for example, programs to be executed by the CPU 24a. In addition, in the embodiment, an external device connected to the ECU 24 may include the SSD 24f as a main storage device.

With the above configuration, the ECU 24 collectively controls each part of the vehicle 1 by transmitting a control signal to each part of the vehicle 1 via the in-vehicle network 23. At this time, the ECU 24 may use, for example, the image data obtained from the imaging unit 15 or the detection results of various sensors acquired via the in-vehicle network 23 for control. The various sensors are, for example, the torque sensor 13b, the brake sensor 18b, the steering angle sensor 19, the accelerator sensor 20, the shift sensor 21, and the wheel speed sensor 22 described above. In addition, the ECU 24 may also use information related to an input operation using the touch panel 10, which is acquired via the in-vehicle network 23, for control.

By the way, there has been considered a technology of generating a peripheral image showing a circumstance around the vehicle 1 viewed from a virtual viewpoint based on a captured image obtained by imaging a periphery of the vehicle 1 and presenting the generated peripheral image to the occupant of the vehicle 1. As such a technology, for example, there has been known a technology of presenting, to the occupant, a peripheral image viewed from a virtual viewpoint in which an obstacle appears when the obstacle is detected in the heading direction of the vehicle 1.

In the above-described conventional technology, a change in the virtual viewpoint occurs only when the obstacle is detected. However, in order to further improve the convenience of grasping a circumstance around the vehicle 1, it is necessary to change the virtual viewpoint of a peripheral image (the direction of a line of sight for grasping the circumstance around the vehicle 1) without presupposing the detection of the obstacle.

In view of this, the embodiment realizes a periphery monitoring device 400 to be described later in the ECU 24 and makes it possible to (continuously) change a virtual viewpoint according to the steering angle of the vehicle 1, thereby further improving the convenience of grasping a circumstance around the vehicle 1.

Figure 4:
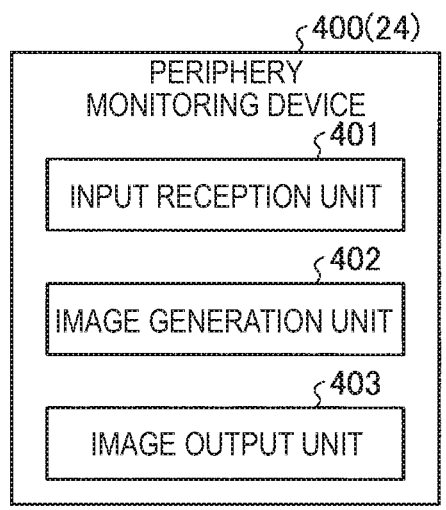
FIG. 4 is an exemplary and schematic block diagram illustrating a functional configuration of a periphery monitoring device realized in an ECU of the vehicle according to the embodiment.

FIG. 4 is an exemplary and schematic block diagram illustrating a functional configuration of the periphery monitoring device 400 realized in the ECU 24 of the vehicle 1 according to the embodiment.

As illustrated in FIG. 4, the periphery monitoring device 400 includes an input reception unit 401, an image generation unit 402, and an image output unit 403. A functional module group illustrated in FIG. 4 is realized in the ECU 24 as a result of the CPU 24a executing predetermined software (control program) stored in, for example, the ROM 24b or the SSD 24f. In addition, in the embodiment, a part of or the entire functional module group illustrated in FIG. 4 may be realized by dedicated hardware (circuit).

The input reception unit 401 receives various operation inputs performed by the occupant of the vehicle 1. In the embodiment, the input reception unit 401 is configured to be capable of receiving, for example, information related to an operation via the touch panel 10 or information related to an operation of the steering unit 4 as an operation input.

The image generation unit 402 acquires, from the imaging unit 15, a captured image obtained by imaging a circumstance around the vehicle 1 by the imaging unit 15. In the embodiment, the image generation unit 402 acquires a captured image at a position (hereinafter referred to as a "past position") of the vehicle 1 at a certain time (hereinafter referred to as a "past time"), and generates, based on the acquired captured image, a display image G (see FIGS. 11 to 14 to be described later) capable of viewing a relationship between the vehicle 1 and a circumstance (space) around the vehicle 1. In addition, a specific example of the display image G will be described later, and thus a description thereof will be omitted here.

The image output unit 403 outputs the image (e.g., the above-described display image G) generated by the image generation unit 402 to the display 8.

Here, in the embodiment, the image generation unit 402 generates, as the display image G, an image of a predetermined gaze point in a predetermined virtual space viewed from a predetermined virtual viewpoint. As will be described later, the virtual space is configured based on a model image formed by projecting (pasting) a captured image onto a model (camera image model) representing a three-dimensional virtual plane configured around the vehicle 1 and based on a vehicle image showing the appearance of the vehicle 1 in a three dimensional manner.

Hereinafter, an example of a method for generating the display image G according to the embodiment will be described with reference to FIGS. 5 to 7.

Figure 5:
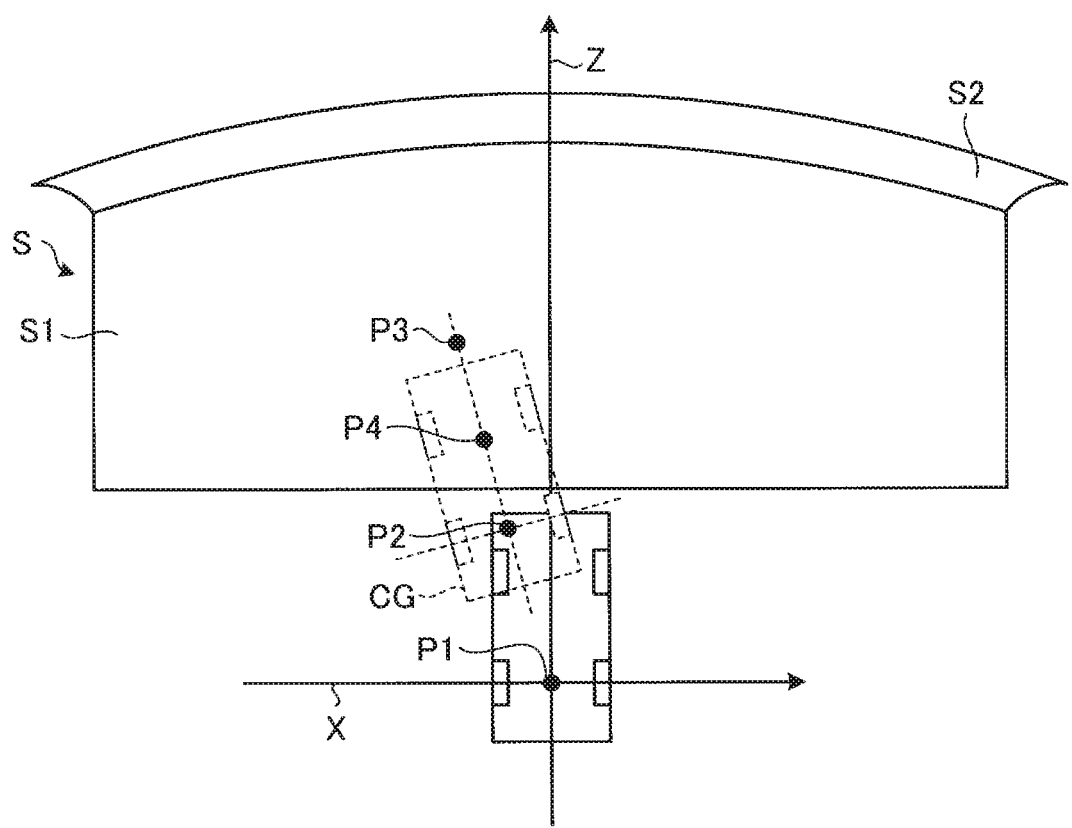
FIG. 5 is an exemplary and schematic view illustrating an example of a camera image model according to the embodiment.
Figure 6:
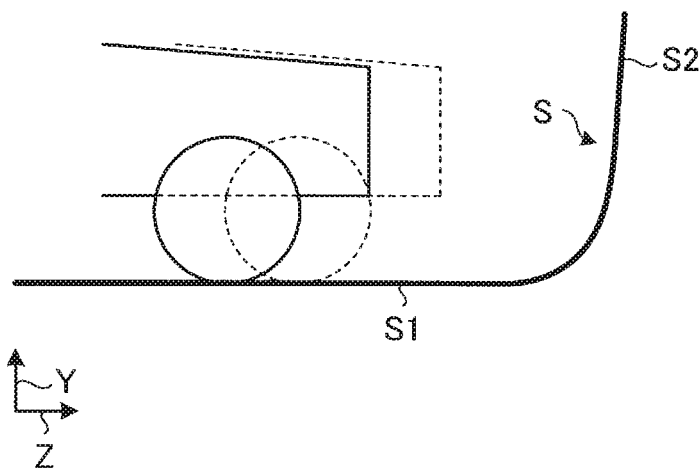
FIG. 6 is an exemplary and schematic view illustrating an example of the camera image model according to the embodiment from a viewpoint different from that in FIG. 5.

FIG. 5 is an exemplary and schematic view illustrating an example of a camera image model S according to the embodiment, and FIG. 6 is an exemplary and schematic view illustrating an example of the camera image model S according to the embodiment from a viewpoint different from that in FIG. 5. In FIGS. 5 and 6, one direction that is parallel to the grounding surface (road surface) of the wheel 3 is illustrated as the Z direction, a direction that is parallel to the grounding surface of the wheel 3 and is orthogonal to the Z direction is illustrated as the X direction, and a direction that is orthogonal to the grounding surface of the wheel 3 is illustrated as the Y direction.

In the embodiment, the image generation unit 402 generates in advance the camera image model S including a first surface S1 and a second surface S2 as illustrated in FIGS. 5 and 6. The first surface S1 is a flat surface corresponding to the road surface on which the vehicle 1 is present. For example, the first surface S1 is configured as an elliptical flat surface. In addition, the second surface S2 is a curved surface on the basis of the first surface S1 that gradually rises from the outer side (outer edge) of the first surface S1 in the Y direction with increasing distance from the first surface S1. For example, the second surface S2 is configured as a curved surface that rises from the outer side of the first surface S1 in an elliptical shape or a parabolic shape in the Y direction. In this manner, the image generation unit 402 generates, as the camera image model S, a model representing a bowl-shaped or cylindrical three-dimensional plane including the first surface S1 and the second surface S2.

In addition, in the embodiment, a model including surfaces having shapes different from those of the first surface S1 and the second surface S2 described above may be generated as the camera image model S as long as it is a model representing a three-dimensional plane. For example, in the embodiment, a model configured by a combination of the above-described first surface S1 and the above-described second surface S2 that vertically or gradually rises with respect to the first surface S1 from the outer side of the first surface S1 may be generated as the camera image model S.

Then, the image generation unit 402 generates a model image by pasting the captured image obtained by imaging at a past position P1 to the camera image model S. More specifically, in the embodiment, the image generation unit 402 creates in advance a coordinate table in which the coordinates (hereinafter referred to as "three-dimensional coordinates") of a point (hereinafter referred to as a "pasting point") in the camera image model S represented in the world coordinate system with the past position P1 as the origin is associated with the coordinates (hereinafter referred to as "camera image coordinates") of a point in the captured image (hereinafter referred to as a "camera image point") to be pasted to the pasting point of the three-dimensional coordinates. Then, the image generation unit 402 generates a model image by pasting the camera image point in the captured image to the pasting point of three-dimensional coordinates associated with the camera image coordinates of the camera image point in the coordinate table. In addition, the coordinate table is created whenever, for example, an internal combustion engine or a motor of the vehicle 1 is started.

Figure 7:
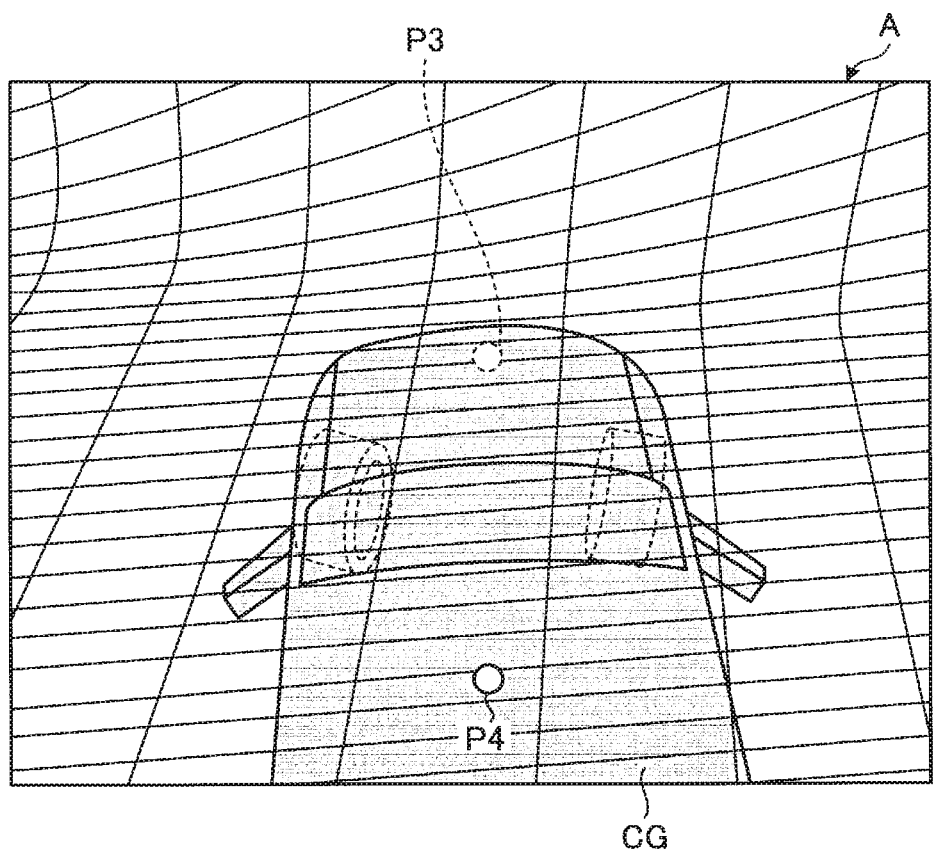
FIG. 7 is an exemplary and schematic view illustrating an example of a virtual space according to the embodiment.

Then, based on the model image generated as described above and a vehicle image CG (see FIG. 5) showing the three-dimensional shape of the vehicle 1, the image generation unit 402 configures a virtual space A as illustrated in FIG. 7, and generates the display image G of a predetermined gaze point P3 in the virtual space A viewed from a predetermined virtual viewpoint P4.

FIG. 7 is an exemplary and schematic view illustrating an example of the virtual space A according to the embodiment.

In the embodiment, the image generation unit 402 configures, as the virtual space A, a space in which the vehicle image CG is located at a position P2 of the vehicle 1 (see FIG. 5) in the model image. When the virtual space A is configured, the image generation unit 402 sets a point (see FIG. 5) vertically lowered from the front end of the vehicle image CG to the first surface S1 to the gaze point P3. Then, the image generation unit 402 generates the display image G of the gaze point P3 viewed from the predetermined virtual viewpoint P4. According to such a display image G, since it is possible to view both an image showing a circumstance around the vehicle 1 and the three-dimensional vehicle image CG at the same time, a relationship between the vehicle 1 and the circumstance (space) around the vehicle 1 may be visually easily grasped. In addition, the vehicle image CG is transparently displayed such that the circumstance around the vehicle 1 is visible in the display image G.

Incidentally, as described above, in the embodiment, in order to further improve the convenience of grasping the circumstance around the vehicle 1, it is possible to change the virtual viewpoint P4 (e.g., the direction of a line of sight for grasping the circumstance around the vehicle 1) according to the steering angle of the vehicle 1.

Accordingly, in the embodiment, the image generation unit 402 (continuously) moves the position of the virtual viewpoint P4 according to an operation of the steering unit 4 for changing the steering angle of the vehicle 1. More specifically, when the steering unit 4 is operated by the occupant of the vehicle 1, the image generation unit 402 moves the virtual viewpoint P4 in a direction including a component in the vehicle width direction (transverse direction) of the vehicle image CG such that an area in the heading direction of the vehicle 1 corresponding to the steering angle realized by the operation more clearly appears in the display image G. At this time, the amount of movement of the virtual viewpoint P4 may be set to change according to the magnitude of the steering angle of the vehicle 1 (the absolute value of a detected value of the steering angle) realized by the operation of the steering unit 4, for example, to decrease as the steering angle becomes smaller.

Figure 8:
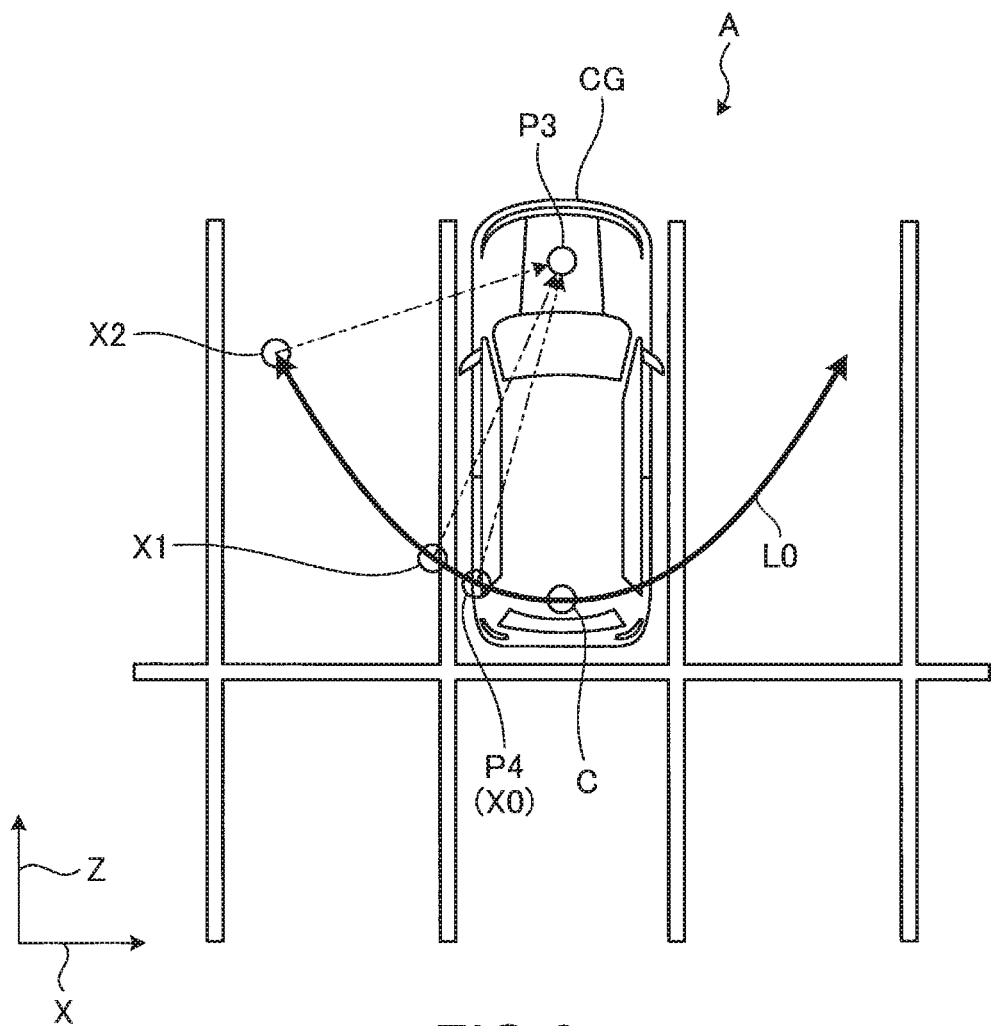
FIG. 8 is an exemplary and schematic view illustrating movement of a virtual viewpoint according to the embodiment in a direction including a component in the vehicle width direction of a vehicle image.

FIG. 8 is an exemplary and schematic view illustrating movement of the virtual viewpoint P4 according to the embodiment in a direction including a component in the vehicle width direction of the vehicle image CG. As illustrated in FIG. 8, when an operation of turning the heading direction of the vehicle 1 to the right side by the steering unit 4 is performed, the image generation unit 402 continuously moves the position of the virtual viewpoint P4 to the left side of the vehicle image CG along a curved (arcuate or parabolic) line segment L0 from the center C to a position X2 by way of a position X0 and a position X1 such that a circumstance at the right side of the vehicle 1 more clearly appears in the display image G. Thus, since the display image G is generated from the virtual viewpoint P4 located at a position at which the circumstance around the vehicle 1 (in the heading direction) may be more clearly grasped (and then is output to the display 8) by simply operating the steering unit 4, it is possible to further improve the convenience of grasping the circumstance in the heading direction of the vehicle 1.

In addition, although not illustrated in FIG. 8, in the embodiment, when the steering unit 4 is operated to turn the heading direction of the vehicle 1 to the left side, needless to say, the virtual viewpoint P4 moves to the right side of the vehicle image CG such that a circumstance at the left side of the vehicle 1 appears in the display image G.

In addition, in the embodiment, when moving the position of the virtual viewpoint P4 in the vehicle width direction (transverse direction) of the vehicle image CG, the image generation unit 402 also moves the position of the virtual viewpoint P4 in the height direction (vertical direction) of the vehicle image CG so as to be in conjunction with the movement. More specifically, the image generation unit 402 lowers the height position of the virtual viewpoint P4 as the virtual viewpoint P4 moves away from the center of the vehicle image CG in the vehicle width direction.

Figure 9:
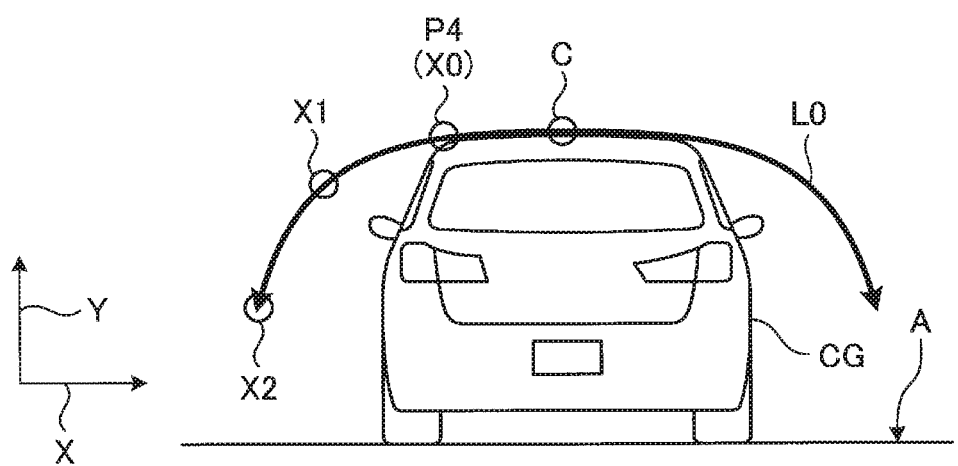
FIG. 9 is an exemplary and schematic view illustrating movement of the virtual viewpoint according to the embodiment in a direction including a component in the height direction of the vehicle image.

FIG. 9 is an exemplary and schematic view illustrating movement of the virtual viewpoint P4 according to the embodiment in a direction including a component in the height direction of the vehicle image CG. FIG. 9 corresponds to FIG. 8 as viewed from the Z direction. As illustrated in FIG. 9, when the operation of turning the heading direction of the vehicle 1 to the right side is performed by the steering unit 4, the image generation unit 402 continuously moves the position of the virtual viewpoint P4 to the lower side of the vehicle image CG along the curved (arcuate or parabolic) line segment L0 from the center C to the position X2 by way of the position X0 and the position X1 such that the circumstance at the right side of the vehicle 1 more clearly appears in the display image G. Thus, since the display image G is generated from the virtual viewpoint P4 located at a height position at which the circumstance in the heading direction of the vehicle 1 may be more clearly grasped (and then is output to the display 8) by simply operating the steering unit 4, it is possible to further improve the convenience of grasping the circumstance in the heading direction of the vehicle 1.

In addition, in the above description, although a configuration in which the movement of the virtual viewpoint P4 in the vehicle width direction (transverse direction) of the vehicle image CG and the movement of the virtual viewpoint P4 in the height direction (vertical direction) of the vehicle image CG are in conjunction with each other is illustrated by way of example, in the embodiment, both may not be in conjunction with each other. That is, in the embodiment, when the steering unit 4 is operated, only the movement of the virtual viewpoint P4 in the vehicle width direction (transverse direction) of the vehicle image CG may be realized.

Here, when adopting a configuration in which the virtual viewpoint P4 is moved when the steering angle of the vehicle 1 changes from zero even slightly, a case where the movement of the virtual viewpoint P4 frequently occurs and the convenience of grasping the circumstance in the heading direction of the vehicle 1 may be damaged may be considered. Thus, the embodiment may be a configuration in which, when the magnitude of the steering angle of the vehicle 1 is below a predetermined first angle, i.e., when the amount of operation (rotation angle) of the steering wheel as the steering unit 4 is below a first threshold, the movement of the virtual viewpoint P4 is restricted and the virtual viewpoint P4 is fixed.

In addition, when adopting a configuration in which the virtual viewpoint P4 is continuously moved until the magnitude of the steering angle of the vehicle 1 reaches the maximum angle from the first angle, since the virtual viewpoint P4 capable of maximally grasping the circumstance in the heading direction of the vehicle 1 (see the position X2 illustrated in FIGS. 8 and 9) is not realized until the amount of operation (rotation angle) of the steering wheel as the steering unit 4 reaches the maximum value, convenience is also damaged in this case. Thus, when the magnitude of the steering angle of the vehicle 1 is above a second angle greater than the above-mentioned first angle, i.e., when the amount of operation (rotation angle) of the steering wheel as the steering unit 4 is above a second threshold greater than the first threshold, the embodiment may be a configuration in which the movement of the virtual viewpoint P4 is restricted and the virtual viewpoint P4 is fixed. In this configuration, when the magnitude of the steering angle of the vehicle 1 reaches a second angle, i.e., when the amount of operation (rotation angle) of the steering wheel as the steering unit 4 reaches the second threshold, the virtual viewpoint P4 capable of maximally grasping the circumstance in the heading direction of the vehicle 1 is realized.

Figure 10:
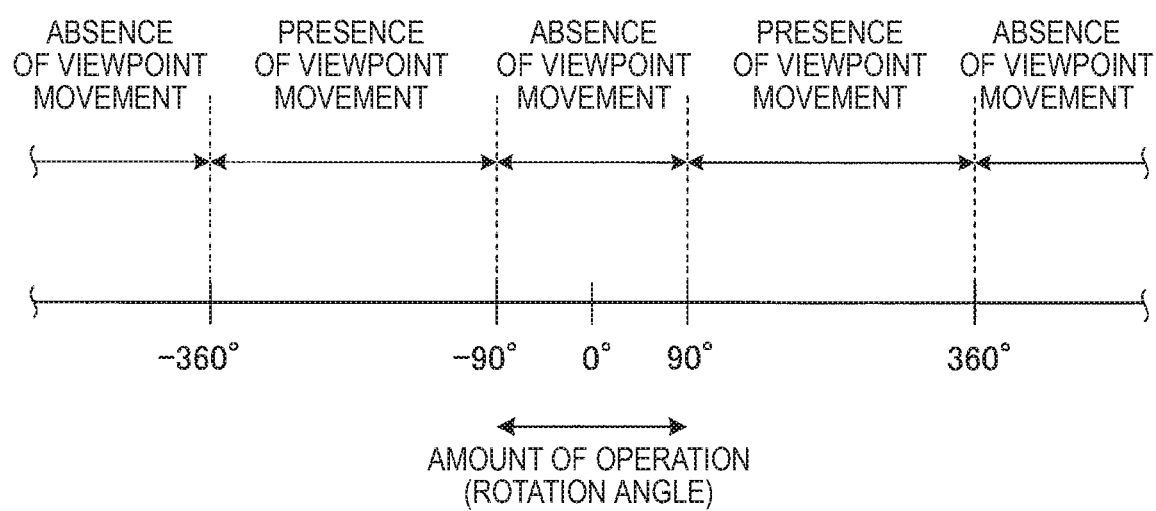
FIG. 10 is an exemplary and schematic view illustrating a relationship between the amount of operation of a steering unit according to the embodiment and the presence or absence of movement of the virtual viewpoint.

FIG. 10 is an exemplary and schematic view illustrating a relationship between the amount of operation of the steering unit 4 according to the embodiment and the presence or absence of the movement of the virtual viewpoint P4. In the example illustrated in FIG. 10, the movement of the virtual viewpoint P4 is performed only when the magnitude of the amount of operation (rotation angle) of the steering wheel as the steering unit 4 is within a predetermined range (a range from 90° to 360°), and in other cases, the virtual viewpoint P4 is fixed, rather than being moved. In addition, a numerical value such as 90° or 360° is merely given by way of example, and in practice, the movement of the virtual viewpoint P4 may be performed within a range other than 90° to 360°.

By the way, in the configuration as described above, the convenience to the occupant is further improved as long as the movement of the virtual viewpoint P4 may be realized by other methods than operating the steering unit 4. As another method, for example, it is conceivable to provide a predetermined graphical user interface (GUI) on the display image G so as to realize the movement of the virtual viewpoint P4 according to an operation via the touch panel 10 with respect to the GUI. However, when the movement of the virtual viewpoint P4 according to the operation of the steering unit 4 and the movement of the virtual viewpoint P4 according to the operation via the touch panel 10 are simultaneously executed, the operation may be confused, which may cause damage to convenience.

Therefore, in the embodiment, when an operation of moving the virtual viewpoint P4 in an arbitrary direction via an operation input unit (e.g., the touch panel 10) different from the steering unit 4 is performed, the image generation unit 402 terminates a first mode (automatic mode) of automatically moving the virtual viewpoint P4 according to the operation of the steering unit 4, and executes a second mode (manual mode) of manually moving the virtual viewpoint P4 according to the operation of the touch panel 10 regardless of the operation of the steering unit 4.

Then, when a predetermined condition is satisfied during the execution of the second mode, the image generation unit 402 terminates the second mode and executes the first mode. The predetermined condition is set so as to include any one of a condition in which a predetermined time is elapsed since the operation of the touch panel 10 is last performed, a condition in which the image output to the display 8 shifts from the display image G to another image different from the display image G, and thereafter again shifts from the other image to the display image G, and a condition in which a predetermined operation other than the operation of moving the virtual viewpoint P4 is performed. By setting in this way, it is possible to perform a shift from the second mode to the first mode at an appropriate timing.

Hereinafter, the movement of the virtual viewpoint P4 realized according to the operation of the steering unit 4 or the operation via the touch panel 10 will be described together with a specific example of the display image G output to the display 8.

Figure 11:
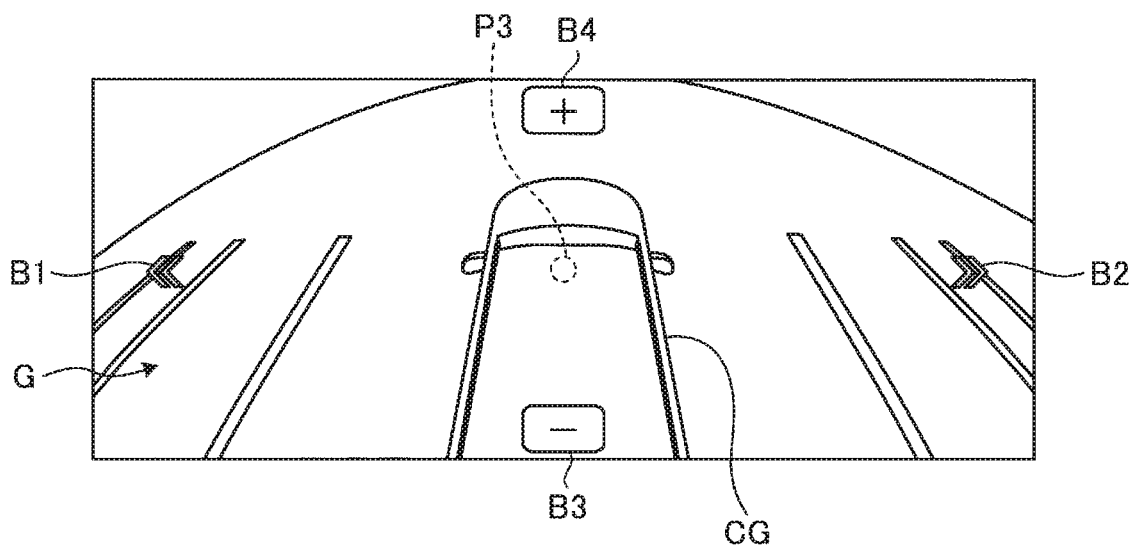
FIG. 11 is an exemplary and schematic view illustrating an example of a display image according to the embodiment.

FIG. 11 is an exemplary and schematic view illustrating an example of the display image G according to the embodiment. The virtual viewpoint P4 of the display image G illustrated in FIG. 11 corresponds to the center C illustrated in FIGS. 8 and 9.

For example, the image generation unit 402 generates the display image G illustrated in FIG. 11 when none of the above-described two types of operations for moving the virtual viewpoint P4 has been executed yet. Then, the image generation unit 402 superimposes, as a GUI for receiving an operation including the movement of the virtual viewpoint P4, a left button B1 for moving the virtual viewpoint P4 to the left side, a right button B2 for moving the virtual viewpoint P4 to the right side, a minus button B3 for widening the viewing angle from the virtual viewpoint P4, and a plus button B4 for narrowing the viewing angle from the virtual viewpoint P4 on the display image G.

Figure 12:
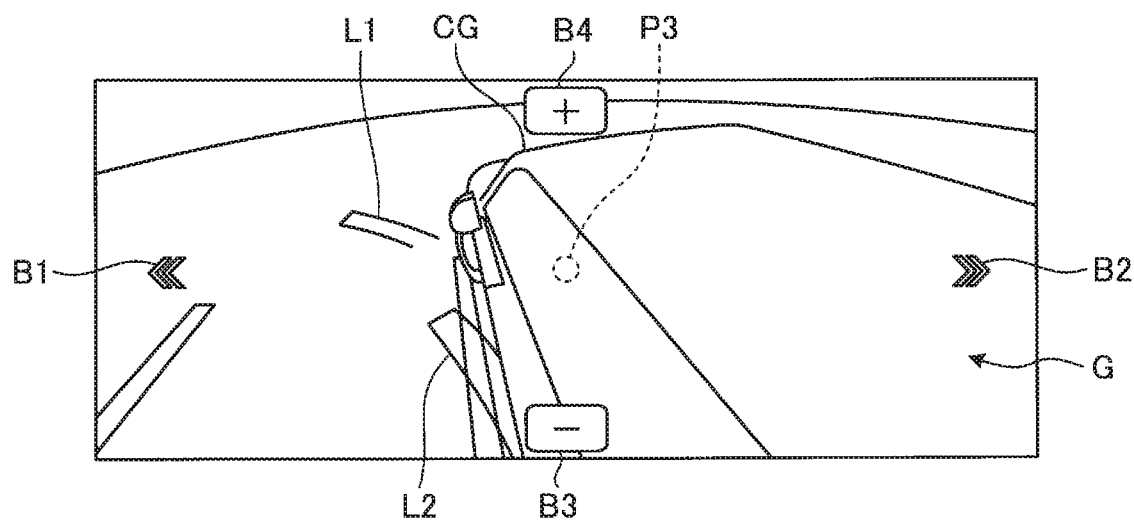
FIG. 12 is an exemplary and schematic view illustrating an example of a state where the movement of the virtual viewpoint has occurred with respect to the display image illustrated in FIG. 11 in the embodiment.

Then, in a state where the display image G illustrated in FIG. 11 is displayed, when a rotation operation of turning the steering wheel as the steering unit 4 in the counterclockwise direction or an operation of the left button B1 via the touch panel 10 is detected, the image generation unit 402 continuously moves the position of the virtual viewpoint P4 and generates the display image G illustrated in FIG. 12.

FIG. 12 is an exemplary and schematic view illustrating an example of a state where the movement of the virtual viewpoint P4 has occurred with respect to the display image G illustrated in FIG. 11 in the embodiment. The virtual viewpoint P4 of the display image G illustrated in FIG. 12 corresponds to the position X0 illustrated in FIGS. 8 and 9.

Here, guide lines L1 and L2 which are a reference of the traveling path of the vehicle 1 are displayed on the display image G illustrated in FIG. 12. The guide line L1 indicates a trajectory assumed to be traced by the left front end portion of the vehicle 1 when the vehicle 1 travels at a current steering angle, and the guide line L2 indicates a trajectory assumed to be traced by the rear left wheel of the vehicle 1 when the vehicle 1 travels at the current steering angle. Such guide lines L1 and L2 are displayed only when the movement of the virtual viewpoint P4 actually occurs. Thus, in the embodiment, in a case where the movement of the virtual viewpoint P4 is restricted as described above, more specifically, in a case where the movement of the virtual viewpoint P4 is restricted since the magnitude of the steering angle of the vehicle 1 is below the first angle, the guide lines L1 and L2 are displayed only when the magnitude of the steering angle of the vehicle 1 is equal to or greater than the first angle.

Figure 13:
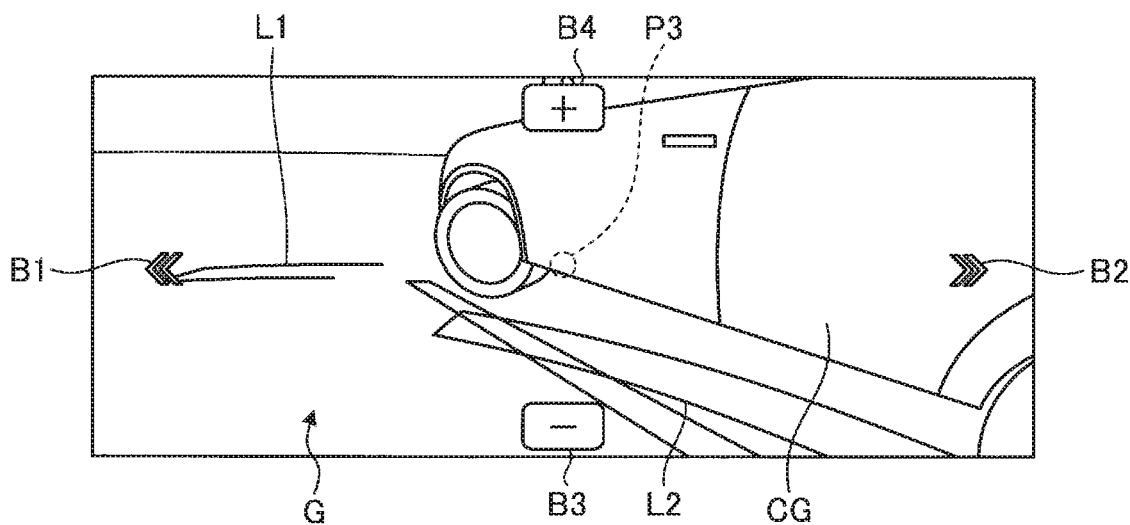
FIG. 13 is an exemplary and schematic view illustrating an example of a state where the further movement of the virtual viewpoint has occurred with respect to the display image illustrated in FIG. 12 in the embodiment.
Figure 14:
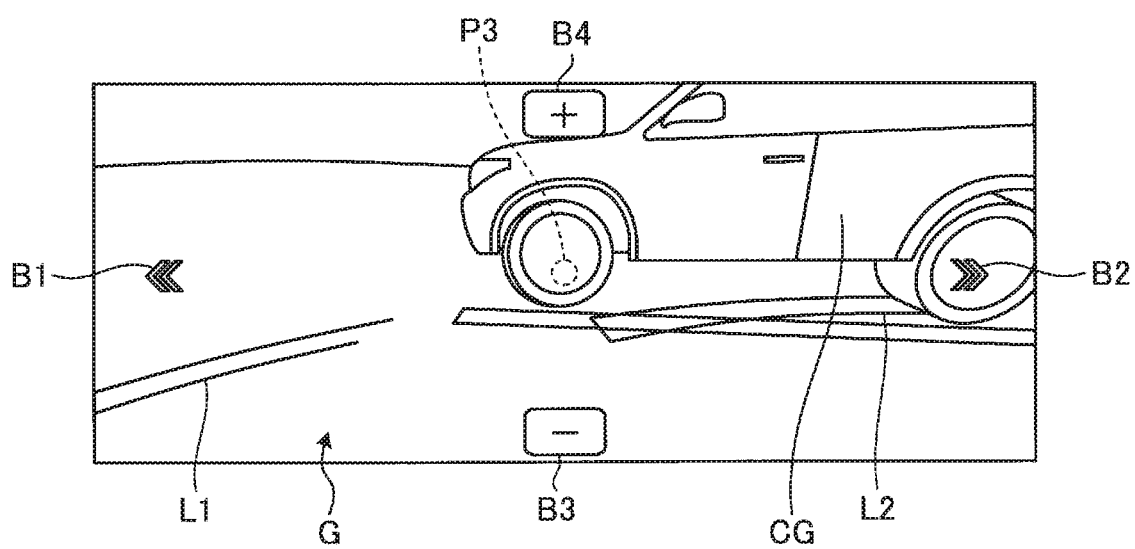
FIG. 14 is an exemplary and schematic view illustrating an example of a state where the further movement of the virtual viewpoint has occurred with respect to the display image illustrated in FIG. 13 in the embodiment.

In a state where the display image G illustrated in FIG. 12 is displayed, when a further counterclockwise rotation operation of the steering wheel as the steering unit 4 or a further operation of the left button B1 via the touch panel 10 is detected, the image generation unit 402 also continuously moves the position of the virtual viewpoint P4 to sequentially generate the display images G illustrated in FIGS. 13 and 14.

FIG. 13 is an exemplary and schematic view illustrating an example of a state where the movement of the virtual viewpoint P4 has occurred with respect to the display image G illustrated in FIG. 12 in the embodiment. The virtual viewpoint P4 of the display image G illustrated in FIG. 13 corresponds to the position X1 illustrated in FIGS. 8 and 9.

In addition, FIG. 14 is an exemplary and schematic view illustrating an example of a state where the movement of the virtual viewpoint P4 has occurred with respect to the display image G illustrated in FIG. 13 in the embodiment. The virtual viewpoint P4 of the display image G illustrated in FIG. 14 corresponds to the position X2 illustrated in FIGS. 8 and 9.

As described above, in the embodiment, when the movement of the virtual viewpoint P4 has occurred in the vehicle width direction of the vehicle image CG, the virtual viewpoint P4 also moves in the height direction of the vehicle image CG in conjunction with the movement. More specifically, in the embodiment, the virtual viewpoint P4 is lowered in the height direction of the vehicle image CG with increasing distance from the center C (see FIGS. 8 and 9) in the vehicle width direction of the vehicle image CG. Thus, in the examples illustrated in FIGS. 11 to 14, the height of the virtual viewpoint P4 is gradually lowered according to the transition of the display image G from FIG. 11 to FIG. 14.

In addition, the display image G illustrated in FIGS. 11 to 14 is output to the display 8, for example, in a case where the peripheral monitoring function of the vehicle 1 is turned on manually or automatically in a situation in which the speed of the vehicle 1 is equal to or less than a predetermined value, such as, for example, when starting from a stopped state or when running at a low speed, so that the peripheral monitoring device 400 illustrated in FIG. 4 is realized in the ECU 24.

Next, the flow of a processing executed in the embodiment will be described.

Figure 15:
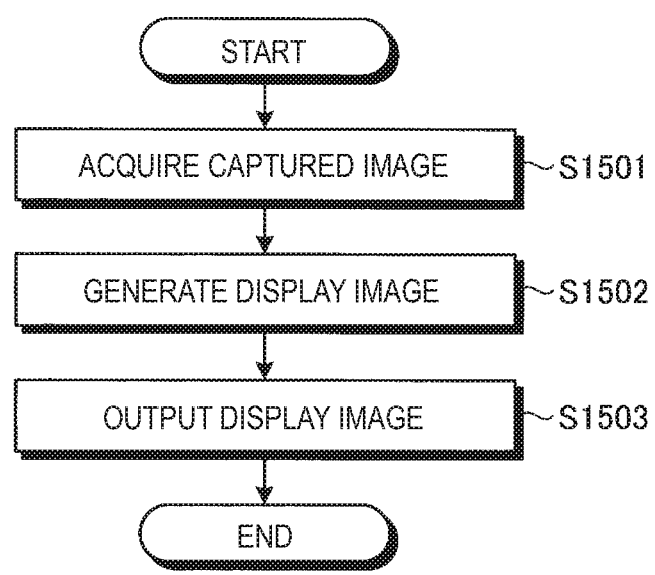
FIG. 15 is an exemplary and schematic flowchart illustrating the flow of a processing executed when the periphery monitoring device according to the embodiment outputs a display image.

FIG. 15 is an exemplary and schematic flowchart illustrating the flow of a processing executed when the peripheral monitoring device 400 according to the embodiment outputs the display image G. The processing flow illustrated in FIG. 15 is repeatedly executed when the peripheral monitoring function of the vehicle 1 is turned on manually or automatically in a situation in which the speed of the vehicle 1 is equal to or less than a predetermined value.

In the processing flow illustrated in FIG. 15, first, in S1501, the peripheral monitoring device 400 acquires an image captured by the imaging unit 15. The captured image is an image showing a circumstance around the vehicle 1.

Then, in S1502, the peripheral monitoring device 400 generates the display image G using the image generation unit 402 based on a model image formed by pasting the captured image acquired in S1501 onto the camera image model S and based on the vehicle image CG showing the appearance of the vehicle 1 in a three dimensional manner.

Then, in S1503, the peripheral monitoring device 400 outputs the display image G generated in S1502 to the display 8 using the image output unit 403. Then, the processing terminates.

Figure 16:
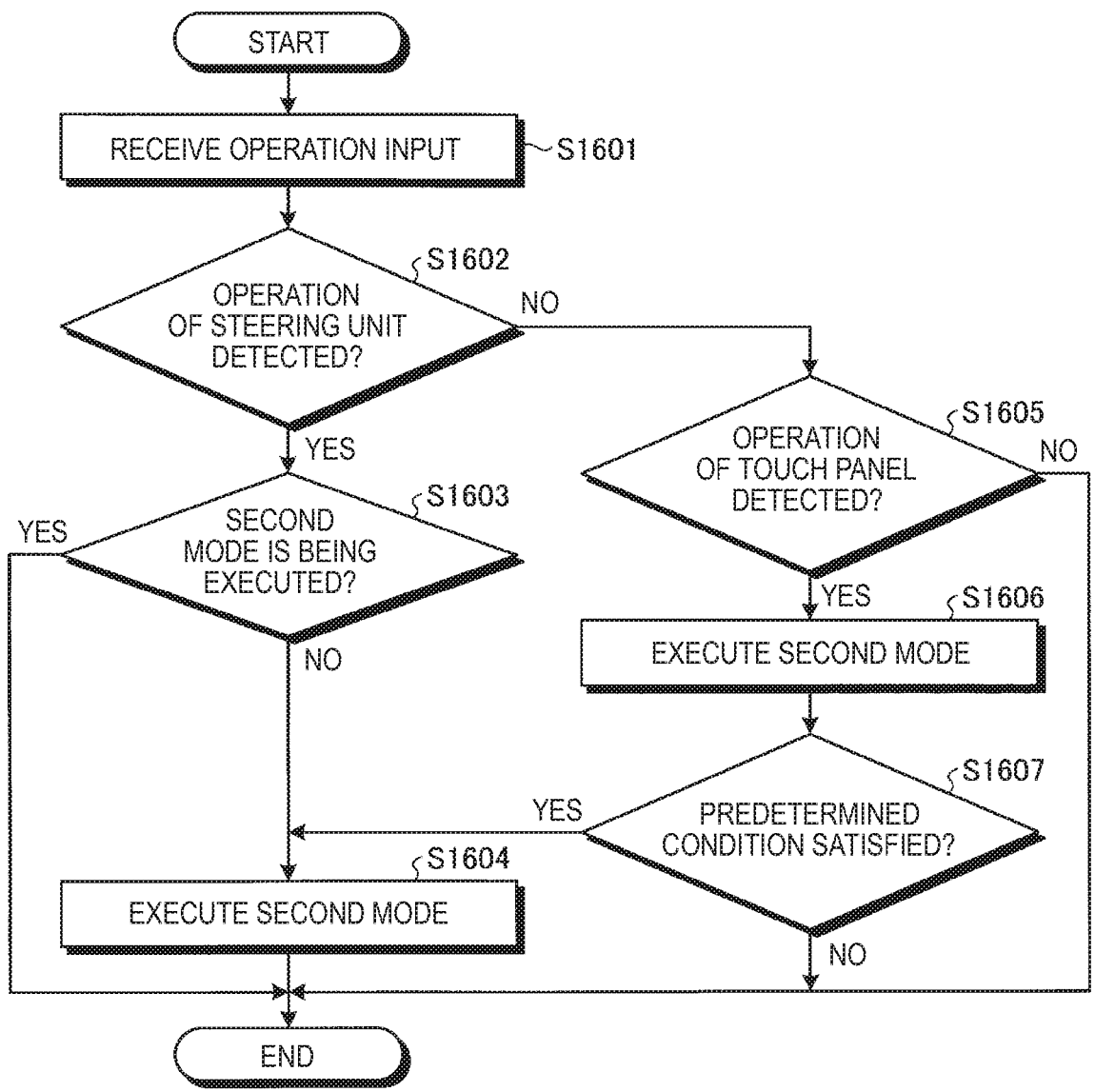
FIG. 16 is an exemplary and schematic flowchart illustrating the flow of a processing executed after the periphery monitoring device according to the embodiment outputs the display image.

FIG. 16 is an exemplary and schematic flowchart illustrating the flow of a processing executed after the peripheral monitoring device 400 according to the embodiment outputs the display image G. The processing flow illustrated in FIG. 16 is repeatedly executed while the display image G is output to the display 8.

In the processing flow illustrated in FIG. 16, first, in S1601, the peripheral monitoring device 400 receives an operation input by the occupant of the vehicle 1 via any of various operation input units such as, for example, the steering unit 4 or the touch panel 10 using the input reception unit 401.

Then, in S1602, the peripheral monitoring device 400 determines whether or not the operation of the steering unit 4 has been detected, more specifically, whether or not the operation received in S1601 corresponds to the operation for moving the virtual viewpoint P4 using the steering unit 4.

In S1602, when it is determined that the operation of the steering unit 4 has been detected, the processing proceeds to S1603. Then, in S1603, the peripheral monitoring device 400 determines whether or not the second mode of manually moving the virtual viewpoint P4 according to the operation of the touch panel 10 regardless of the operation of the steering unit 4 is already being executed.

In S1603, when it is determined that the second mode is already being executed, the processing terminates as it is. On the other hand, in S1603, when it is determined that the second mode is not being executed, the processing proceeds to S1604.

In S1604, the peripheral monitoring device 400 executes the first mode of automatically moving the virtual viewpoint P4 according to the operation of the steering unit 4. That is, the peripheral monitoring device 400 continuously moves the virtual viewpoint P4 of the display image G according to the amount of operation of the steering unit 4 received in S1601. Then, the processing terminates.

On the other hand, in S1602, when it is determined that the operation of the steering unit 4 has not been detected, i.e., when it is determined that the operation received in S1601 is not the operation of the steering unit 4, the processing proceeds to S1605. Then, in S1605, the peripheral monitoring device 400 determines whether or not the operation of the touch panel 10 has been detected, more specifically, whether or not the operation received in S1601 corresponds to the operation for moving the virtual viewpoint P4 using the touch panel 10.

In S1605, when it is determined that the operation of the touch panel 10 is not detected, the processing terminates as it is since the operation received in S1601 does not correspond to the operation for moving the virtual viewpoint P4. On the other hand, in S1605, when it is determined that the operation of the touch panel 10 has been detected, the processing proceeds to S1606.

In S1606, the peripheral monitoring device 400 executes the second mode of manually moving the virtual viewpoint P4 according to the operation of the touch panel 10 regardless of the steering of the steering unit 4. That is, the peripheral monitoring device 400 moves the virtual viewpoint P4 of the display image G according to the operation of the touch panel 10 received in S1601.

Then, in S1607, the peripheral monitoring device 400 determines whether or not a predetermined condition as a criterion for determining whether or not to terminate the second mode and execute the first mode is satisfied. As described above, the predetermined condition is set so as to include any one of a condition in which a predetermined time is elapsed since the operation of the touch panel 10 is last performed, a condition in which the image output to the display 8 shifts from the display image G to another image different from the display image G, and thereafter again shifts from the other image to the display image G, and a condition in which a predetermined operation other than the operation of moving the virtual viewpoint P4 is performed.

In S1607, when it is determined that the predetermined condition is satisfied, the processing proceeds to S1604, and a shift to the first mode is performed. Then, in S1604, the peripheral monitoring device 400 executes the first mode, and the processing terminates.

In addition, in S1607, when it is determined that the predetermined condition is not satisfied, the second mode is maintained without a shift to the first mode, and the processing terminates.

As described above, the peripheral monitoring device 400 according to the embodiment includes the image generation unit 402 which generates the display image G viewed from the virtual viewpoint P4 showing the gaze point P3 in the virtual space A based on the model image and the vehicle image CG and the image output unit 403 which outputs the display image G to the display 8. The image generation unit 402 moves the virtual viewpoint P4 in the direction including the component in the vehicle width direction of the vehicle image CG in response to the operation of the steering unit 4 for changing the steering angle of the vehicle 1. According to this configuration, since the virtual viewpoint P4 (the direction of the line of sight for grasping the circumstance around the vehicle 1) of the display image G may be changed by simply changing the steering angle of the vehicle 1 via the operation of the steering unit 4, it is possible to further improve the convenience of grasping the circumstance around the vehicle 1.

In addition, the image generation unit 402 according to the embodiment may change the position of the virtual viewpoint P4 according to the magnitude of the steering angle of the vehicle 1 realized by the operation of the steering unit 4. With this configuration, since the direction of the line of sight (the line of sight for grasping the circumstance around the vehicle 1) from the virtual viewpoint P4 to the gaze point P3 is set according to the magnitude of the steering angle, it is possible to properly grasp the circumstance around the vehicle 1.

In addition, the image generation unit 402 according to the embodiment may fix the position of the virtual viewpoint P4 when the magnitude of the steering angle of the vehicle 1 is lower than a predetermined first angle. With this configuration, for example, unlike a configuration in which the virtual viewpoint P4 is moved when the steering angle of the vehicle 1 changes from zero even slightly, it is possible to prevent frequent movements of the virtual viewpoint P4.

In addition, the image generation unit 402 according to the embodiment may fix the position of the virtual viewpoint P4 even when the magnitude of the steering angle of the vehicle 1 exceeds a predetermined second angle larger than the first angle. With such a configuration, it is possible to avoid a situation that the direction of the line of sight directed from the virtual viewpoint P4 to the gaze point P3 is not fixed until the magnitude of the steering angle of the vehicle 1 exceeds the first angle and reaches the maximum angle. In particular, when adopting a configuration in which the virtual viewpoint P4 capable of maximally grasping a circumstance in the heading direction of the vehicle 1 is realized when the magnitude of the steering angle of the vehicle 1 reaches the second angle, the virtual viewpoint P4 capable of maximally grasping the circumstance in the heading direction of the vehicle 1 may be realized even when the steering unit 4 is not maximally operated and the steering angle of the vehicle 1 does not reach the maximum angle, which may improve convenience.

In addition, when the magnitude of the steering angle of the vehicle 1 is equal to or greater than the first angle, the image generation unit 402 according to the embodiment may superimpose the guide lines L1 and L2 which are a reference of the traveling path of the vehicle 1 on the display image G. With such a configuration, since the guide lines L1 and L2 are displayed only when the movement of the virtual viewpoint P4 actually occurs, it is possible to prevent the guide lines L1 and L2 from being displayed in an unnecessary situation in which the steering angle of the vehicle 1 is relatively small.

In addition, when an operation of moving the virtual viewpoint P4 in an arbitrary direction via the operation input unit (the touch panel 10) different from the steering unit 4 is performed, the image generation unit 402 according to the embodiment terminates the first mode of moving the virtual viewpoint P4 according to the operation of the steering unit 4 and executes the second mode of moving the virtual viewpoint P4 according to the operation of the touch panel 10 regardless of the operation of the steering unit 4. With this configuration, by simply operating the touch panel 10, it is possible to realize a shift from a state where the virtual viewpoint P4 automatically moves according to the operation of the steering unit 4 to a state where the virtual viewpoint P4 may be adjusted only manually.

In addition, when a predetermined condition is satisfied during the execution of the second mode, the image generation unit 402 according to the embodiment terminates the second mode and executes the first mode. With this configuration, it is possible to easily realize a shift from a state where the virtual viewpoint P4 may be adjusted only manually to a state where the virtual viewpoint P4 automatically moves according to the operation of the steering unit 4.

In addition, in the above configuration, the predetermined condition is set so as to include any one of a condition in which a predetermined time is elapsed since the operation of the touch panel 10 is last performed, a condition in which the image output to the display 8 shifts from the display image G to another image different from the display image G, and thereafter again shifts from the other image to the display image G, and a condition in which a predetermined operation other than the operation of moving the virtual viewpoint P4 is performed. With this configuration, it is possible to realize a shift from the second mode to the first mode at an appropriate timing.

Modification

In the above-described embodiment, a configuration (see FIG. 8) in which only the virtual viewpoint P4 moves but the gaze point P3 does not move is illustrated. However, as a modification, a configuration in which the virtual viewpoint P4 does not move and only the gaze point P3 moves with the same technical idea as in the above-described embodiment, or a configuration in which both the virtual viewpoint P4 and the gaze point P3 move in conjunction with each other may be considered.

Figure 17:
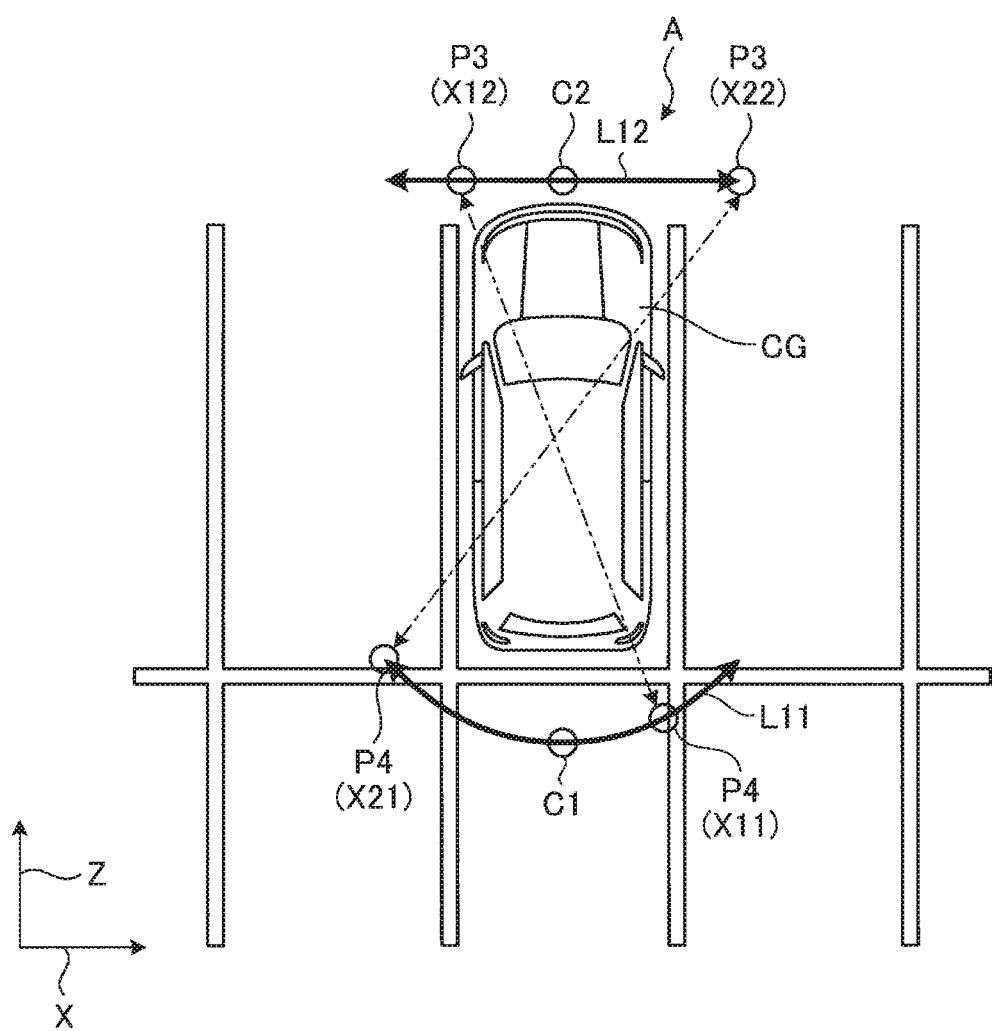
FIG. 17 is an exemplary and schematic view illustrating movement of a virtual viewpoint and a gaze point in conjunction with each other according to a modification.

FIG. 17 is an exemplary and schematic view illustrating movement of both the virtual viewpoint P4 and the gaze point P3 in conjunction with each other according to a modification. In the example illustrated in FIG. 17, the virtual viewpoint P4 moves along a curved (arcuate or parabolic) line segment L11, and the gaze point P3 moves along a linear line segment L12. In addition, in an initial state before, for example, the operation of the steering unit 4 is performed, the virtual viewpoint P4 is located at a center C1 of the line segment L11 in the vehicle width direction of the vehicle image CG, and the gaze point P3 is located at a center C2 of the line segment L12 in the vehicle width direction of the vehicle image CG.

Here, in the example illustrated in FIG. 17, the virtual viewpoint P4 and the gaze point P3 move opposite to each other in the vehicle width direction of the vehicle image CG. For example, when the virtual viewpoint P4 moves to a position X11 at the right side of the center C1 of the line segment L11, the gaze point P3 moves to a position X12 at the left side of the center C2 of the line segment L12. In addition, when the virtual viewpoint P4 moves to a position X21 on the end of the line segment L11 at the left side of the center C1, the gaze point P3 moves to a position X22 on the end of the line segment L12 at the right side of the center C2.

As described above, in the modification, the image generation unit 402 may move both the virtual viewpoint P4 and the gaze point P3 according to the operation of the steering unit 4 (or the operation of the touch panel 10) such that both the virtual viewpoint P4 and the gaze point P3 move opposite to each other in the vehicle width direction of the vehicle image CG. With this configuration, it is possible to change the direction of the line of sight directed from the virtual viewpoint P4 to the gaze point P3 to a greater extent by a less operation.

In addition, in the modification illustrated in FIG. 17, the virtual viewpoint P4 and the gaze point P3 move opposite to each other in the vehicle width direction of the vehicle image CG, but, as another modification, the virtual viewpoint P4 and the gaze point P3 may move in the same direction in the vehicle width direction of the vehicle image CG.

In addition, the embodiment and the modification described above exemplify a configuration in which the operation direction (rotation direction) of the steering wheel as the steering unit 4 and the movement direction of the line of sight directed from the virtual viewpoint P4 to the gaze point P3 coincide with each other. That is, in the embodiment and the modification described above exemplify a configuration in which, when the steering wheel as the steering unit 4 is operated (rotated) clockwise, the line of sight directed from the virtual viewpoint P4 to the gaze point P3 moves so as to be directed to the right side, and when the steering wheel as the steering unit 4 is operated (rotated) counterclockwise, the line of sight directed from the virtual viewpoint P4 to the gaze point P3 moves so as to be directed to the left side. However, as still another modification, a configuration in which the direction of operation (rotation direction) of the steering wheel as the steering unit 4 and the direction of the line of sight directed from the virtual viewpoint P4 to the gaze point P3 after a change in response to the operation of the steering unit 4 may not coincide (reversed) with each other. According to this configuration, when operating the steering unit 4, it is possible to confirm a circumstance outside the turn of the vehicle 1 realized by the operation (e.g., a circumstance around the front-side corner portion positioned outside the turn).

In addition, in the above-described embodiment, a configuration in which the display image G is generated by projecting a captured image (past image) obtained by imaging at the past position P1 onto the predetermined camera image model S is illustrated (see FIGS. 5 to 7). However, as a modification, a configuration in which the display image G is generated by projecting an image obtained by real-time imaging onto a bowl-shaped camera image model S1800 to be described below may also be considered.

Figure 18:
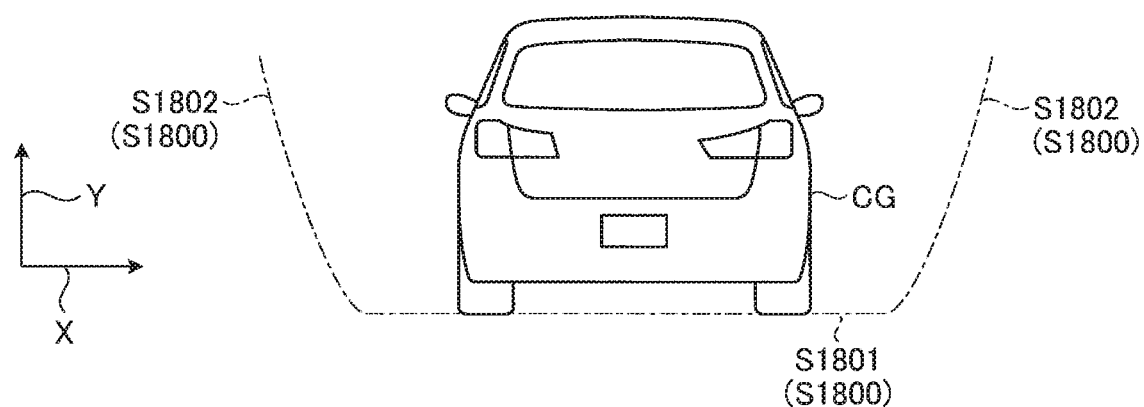
FIG. 18 is an exemplary and schematic view illustrating an example of a camera image model according to a modification.
Figure 19:
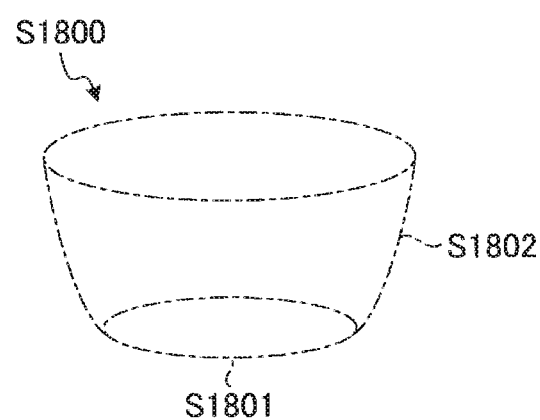
FIG. 19 is an exemplary and schematic view illustrating an example of the camera image model according to the modification from a viewpoint different from that in FIG. 18.

FIG. 18 is an exemplary and schematic view illustrating an example of a camera image model S1800 according to a modification, and FIG. 19 is an exemplary and schematic view illustrating an example of the camera image model S1800 according to the modification from a viewpoint different from that in FIG. 18. As illustrated in FIGS. 18 and 19, in this modification, the bowl-shaped camera image model S1800 having a bottom surface S1801 formed of a flat surface along the road surface and a side surface S1802 curvilinearly rising from the end of the bottom surface S1801 is used. The bottom surface S1801 is configured such that the vehicle image CG is located at the center thereof, and the side surface S1802 is configured to surround the periphery of the vehicle image CG located on the bottom surface S1801. In addition, the virtual viewpoint P4 and the gaze point P3 (neither illustrated in FIGS. 18 and 19) are set to arbitrary positions in a space surrounded by the bottom surface S1801 and the side surface S1802. In the modification, by projecting an image obtained by real-time imaging onto the camera image model S1800 having the bottom surface S1801 and the side surface S1802, the display image G similar to that of the above-described embodiment is generated.

In addition, the camera image model used for projecting the image obtained by real-time imaging is not limited to the bowl-shaped camera image model S1800 illustrated in FIGS. 18 and 19. As an example of another camera image model, for example, a hemispherical camera image model having no boundary between the bottom surface and the side surface may be considered, and a camera image model having a truncated conical shape having the side surface linearly rising from the end of the bottom surface may also be considered.

A periphery monitoring device as one example of an embodiment of this disclosure includes an image generation unit configured to generate a display image in which a gaze point in a virtual space is viewed from a virtual viewpoint, the virtual space being based on a model image formed by projecting a captured image obtained by imagining a periphery of a vehicle with an imaging unit mounted in the vehicle onto a model representing a three-dimensional virtual plane configured around the vehicle, and an image output unit configured to output the display image to a display unit, in which the image generation unit moves at least one of the virtual viewpoint and the gaze point in a direction including a component in a vehicle width direction of the vehicle according to an operation of a steering unit for changing a steering angle of the vehicle.

According to the periphery monitoring device described above, since it is possible to change at least one of the virtual viewpoint and the gaze point of the display image (the direction of a line of sight for grasping a circumstance around the vehicle) by simply changing the steering angle of the vehicle via the operation of the steering unit, it is possible to further improve the convenience of grasping the circumstance around the vehicle.

In the periphery monitoring device described above, the image generation unit may change a position of at least one of the virtual viewpoint and the gaze point according to a magnitude of the steering angle of the vehicle realized by the operation of the steering unit. According to this configuration, since the direction of a line of sight directed from the virtual viewpoint to the gaze point (the direction of a line of sight for grasping a circumstance around the vehicle) is set according to the magnitude of the steering angle, it is possible to appropriately grasp the circumstance around the vehicle.

In the periphery monitoring device described above, the image generation unit may fix the position of at least one of the virtual viewpoint and the gaze point when the magnitude of the steering angle of the vehicle is below a first angle. According to this configuration, for example, unlike a configuration in which the line of sight directed from the virtual viewpoint to the gaze point changes when the steering angle of the vehicle changes even slightly from zero, it is possible to prevent a change in the line of sight directed from the virtual viewpoint to the gaze point from frequently occurring.

In the periphery monitoring device described above, the image generation unit may fix the position of at least one of the virtual viewpoint and the gaze point when the magnitude of the steering angle of the vehicle is above a second angle greater than the first angle. According to this configuration, it is possible to avoid a situation that the direction of the line of sight directed from the virtual viewpoint to the gaze point is not fixed until the magnitude of the steering angle of the vehicle exceeds the first angle and reaches the maximum angle.

In the periphery monitoring device described above, the image generation unit may superimpose a guide line that is a reference of a traveling path of the vehicle on the display image when the magnitude of the steering angle of the vehicle is equal to or greater than the first angle. According to this configuration, since the guide line is displayed only when movement of at least one of the virtual viewpoint and the gaze point actually occurs, it is possible to prevent the guide line from being displayed in an unnecessary situation in which the steering angle of the vehicle is relatively small.

In the periphery monitoring device described above, the image generation unit may terminate a first mode in which at least one of the virtual viewpoint and the gaze point is moved according to the operation of the steering unit when an operation to move at least one of the virtual viewpoint and the gaze point in an arbitrary direction is performed via an operation input unit different from the steering unit, and execute a second mode in which at least one of the virtual viewpoint and the gaze point is moved according to the operation of the operation input unit regardless of the operation of the steering unit. According to this configuration, it is possible to realize a shift from a state where at least one of the virtual viewpoint and the gaze point automatically moves according to the operation of the steering unit to a state where at least one of the virtual viewpoint and the gaze point may be adjusted only manually by simply operating the operation input unit.

In the periphery monitoring device described above, the image generation unit may terminate the second mode when a predetermined condition is satisfied during execution of the second mode, and execute the first mode. According to this configuration, it is possible to easily realize a shift from a state where at least one of the virtual viewpoint and the gaze point may be adjusted only manually to a state where at least one of the virtual viewpoint and the gaze point automatically moves according to the operation of the steering unit.

In the periphery monitoring device described above, the predetermined condition may include any one of a condition in which a predetermined time is elapsed since the operation of the operation input unit is last performed, a condition in which the image output to the display unit shifts from the display image to another image different from the display image and thereafter again shifts from the another image to the display image, and a condition in which a predetermined operation other than the operation to move at least one of the virtual viewpoint and the gaze point is performed. According to this configuration, it is possible to perform a shift from the second mode to the first mode at an appropriate timing.

In the periphery monitoring device described above, the image generation unit may move both the virtual viewpoint and the gaze point according to the operation of the steering unit such that the virtual viewpoint and the gaze point move opposite to each other in the vehicle width direction. According to this configuration, it is possible to change the direction of the line of sight directed from the virtual viewpoint to the gaze point to a greater extent by a less operation.

In the periphery monitoring device described above, the image generation unit may move at least one of the virtual viewpoint and the gaze point in the direction including the component in the vehicle width direction of the vehicle such that an area in a heading direction of the vehicle corresponding to the steering angle realized by the operation of the steering unit is included in the display image when the operation of the steering unit is performed.

Although the embodiments and modifications of the present disclosure have been described above, the above-described embodiments and modifications are merely given by way of example, and are not intended to limit the scope of the disclosure. The novel embodiments and modifications described above may be implemented in various forms, and various omissions, substitutions, and changes may be made without departing from the spirit of the disclosure. The above-described embodiments and modifications are included in the scope and gist of the disclosure, and are included in the invention described in the claims and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A periphery monitoring device comprising:
at least one processor configured to implement:
an image generation unit configured to generate a display image in which a gaze point in a virtual space is viewed from a virtual viewpoint, the virtual space being based on a model image formed by projecting a captured image obtained by imagining a periphery of a vehicle with an imaging unit mounted in the vehicle onto a model representing a three-dimensional virtual plane configured around the vehicle; and
an image output unit configured to output the display image to a display unit,
wherein the image generation unit moves at least one of the virtual viewpoint and the gaze point in a direction including a component in a vehicle width direction of the vehicle according to an operation of a steering unit for changing a steering angle of the vehicle;
wherein the image generation unit terminates a first mode in which at least one of the virtual viewpoint and the gaze point is moved according to the operation of the steering unit when an operation to move at least one of the virtual viewpoint and the gaze point in an arbitrary direction is performed via an operation input unit different from the steering unit, and executes a second mode in which at least one of the virtual viewpoint and the gaze point is moved according to the operation of the operation input unit regardless of the operation of the steering unit.

2. The periphery monitoring device according to claim 1, wherein the image generation unit changes a position of at least one of the virtual viewpoint and the gaze point according to a magnitude of the steering angle of the vehicle realized by the operation of the steering unit.

3. The periphery monitoring device according to claim 2, wherein the image generation unit fixes the position of at least one of the virtual viewpoint and the gaze point when the magnitude of the steering angle of the vehicle is below a first angle.

4. The periphery monitoring device according to claim 3, wherein the image generation unit fixes the position of at least one of the virtual viewpoint and the gaze point when the magnitude of the steering angle of the vehicle is above a second angle greater than the first angle.

5. The periphery monitoring device according to claim 3, wherein the image generation unit superimposes a guide line that is a reference of a traveling path of the vehicle on the display image when the magnitude of the steering angle of the vehicle is equal to or greater than the first angle.

6. The periphery monitoring device according to claim 1, wherein the image generation unit terminates the second mode when a predetermined condition is satisfied during execution of the second mode, and executes the first mode.

7. The periphery monitoring device according to claim 6, wherein the predetermined condition includes any one of a condition in which a predetermined time is elapsed since the operation of the operation input unit is last performed, a condition in which the image output to the display unit shifts from the display image to another image different from the display image and thereafter again shifts from the another image to the display image, and a condition in which a predetermined operation other than the operation to move at least one of the virtual viewpoint and the gaze point is performed.

8. The periphery monitoring device according to claim 1, wherein the image generation unit moves both the virtual viewpoint and the gaze point according to the operation of the steering unit such that the virtual viewpoint and the gaze point move opposite to each other in the vehicle width direction.

9. The periphery monitoring device according to claim 1, wherein the image generation unit moves at least one of the virtual viewpoint and the gaze point in the direction including the component in the vehicle width direction of the vehicle such that an area in a heading direction of the vehicle corresponding to the steering angle realized by the operation of the steering unit is included in the display image when the operation of the steering unit is performed.

* * * * *